United States Patent Office 3,560,255
Patented Feb. 2, 1971

3,560,255
COMPOSITE WOOD-POLYMER PRODUCT
Jack Maine, Saginaw, Mich., assignor to C. W. Maine & Sons, Inc., Saginaw, Mich.
No Drawing. Filed Mar. 18, 1968, Ser. No. 714,066
Int. Cl. B44d 1/28; B27k 3/34
U.S. Cl. 117—148                    3 Claims

ABSTRACT OF THE DISCLOSURE

A composite wood-polymer product comprising wood impregnated from its surface inwardly with a polymer of tert-butylstyrene whereby the surface is substantially as tough as Formica and the composite product advantageously can be used in the manufacture of furniture such as desks, chairs, cabinets and the like. This invention also relates to a method for the preparation of such a composite product.

---

This invention relates to a wood product impregnated with a thermoplastic polymer of tert-butylstyrene and to a method for the preparation of the wood product. More particularly, this invention relates to a commercially attractive method of impregnating wood whereby the wood has a surface which is substantially as tough as Formica and the ultimate wood product advantageously can be used in the manufacture of furniture such as desks, chairs, cabinets and the like.

It is known that wood can be impregnated with a plastic so as to provide the wood with a tough, protective surface. Heretofore the manufacturing process has involved essentially a four-stage operation: a deaeration stage, an impregnation stage, a heating stage and a finishing stage. Such a four-stage operation has involved placing the article to be coated in an enclosed area, such as a tank, which is capable of maintaining relatively low pressures and sustaining relatively high pressures. Once the article which is to be impregnated is placed in position within the enclosed area, a vacuum is drawn in order to deaerate the article. By deaerating the wooden article, it is insured that its surface is free of undesirable voids and surface bubbles. After the deaeration step, which lasts about 10 minutes, an impregnating material, generally a liquid monomer such as methyl methacrylate capable of polymerizing to a thermoplastic polymer, and a catalyst such as $\alpha,\alpha'$-azobisisebutyronitrile which is capable of initiating the polymerization of the monomer, are introduced to the tank to a level such that the article is totally immersed. Thereafter, the pressure within the tank is increased to a level such that the polymerizable monomer and polymerization catalyst are driven into the pores of the wood, thereby thoroughly impregnating the wood. The impregnated wood then is removed from the tank and placed in a container which is capable of being sealed and pressurized so as to minimize loss of monomer from the wood. Once the impregnated wood is placed within the container, the container is sealed and then heated to cure the impregnated article. The curing cycle is conducted over a time period of about 12 hours with the temperature of the container maintained at less than about 170° F. in order to avoid charring of the wood. During the curing cycle, some of the monomer escapes from the wood, and the remainder polymerizes to a polymeric product. Following the curing cycle the wood article is planed or sanded to a depth such as to assure a surface containing the polymeric product.

There are significant disadvantages in utilizing a method as described for producing impregnated articles of wood. For example, it is both time consuming and expensive to effect the polymerization of a monomer to a polymeric product in a sealed container utilizing such low polymerization temperatures. As stated, it has been found that if the pressurized container is heated to temperatures in excess of about 170° F., the heat of polymerization may drive the temperature sufficiently high that the wood positioned in the container tends to char. Moreover, the loss of monomer from the wood article during its curing cycle is such that the article must be planed or sanded to a substantial depth to achieve a smooth, tough finish. Planing and sanding operations are expensive, but the greatest expense is the loss of the wood removed in such operations.

The present invention provides for the impregnation of wood products by a method which greatly minimizes polymer loss, eliminates the necessity of utilizing a sealed container, and avoids having to rely on relatively low temperatures during the curing cycle of a wood product which has been impregnated by a polymerizable monomer. In the method of the present invention the overall time of the curing cycle is reduced from about 12 hours to as low as about 3 hours, monomer loss during the curing cycle is negligible, and wood losses due to sanding and the like are minimized greatly. As a result, the method of this invention is particularly desirable from a commercial standpoint.

The present invention provides a wood product having a tough surface which can be machined or otherwise worked to manufacture all types of wood products such as furniture. Wood products produced according to the invention also exhibit greater compressive strength and greater resistance to water absorption with consequent greater resistance to warping and rotting. In addition, the surface of the product has the appearance of the wood, rather than that of a plastic wood substitute. Furthermore, since the wood is impregnated with the plastic monomer, rather than being coated, gouges and scratches in the surface may be repaired easily.

According to this invention an article of wood is impregnated with tert-butylstyrene and the impregnated wood product heated to elevated temperatures, sufficiently high to effect a polymerization of the monomers to solid thermoplastics products while air is circulated around the wood. Utilizing a method as described allows for the use of polymerization temperatures as high as 200° F., thus decreasing the polymerization time.

The term tert-butylstyrene as used herein is intended to encompass all isomers and mixtures thereof.

It is customary to utilize in conjunction with the tert-butylstyrene, a polymerization catalyst which under the impetus of heat will initiate the polymerization of the monomers to thermoplastic products. Illustrative of suitable catalysts are the "azo" type catalysts such as $\alpha,\alpha'$-azobisisobutyronitrile, $\alpha,\alpha'$-azodicyclohexylcarbonitrile, $\alpha,\alpha'$-azobis ($\alpha,\gamma$-dimethyl-gleronitrile) and the like. Other suitable polymerization catalysts for these monomers including other "azo" type catalysts are described in Sorenson & Campbell, Preparative Methods of Organic Chemistry, 1961, Interscience Publishing Co., the disclosure of which is incorporated herein by reference. Other polymerization catalysts such as benzoyl peroxide, dicumylperoxide can be used in lieu of the azo type catalysts. Also, the usual additives such as colorants, antioxidants and the like can be added to the monomers prior to the impregnation of the wood surface.

The temperature at which the heating or curing cycle is conducted can be varied as desired. As an illustration, temperatures as high as about 200° F. can be used in order to decrease the time of the heating cycle. As a general rule, temperatures on the order of about 150° F. to about 200° F. are used.

During the heating or curing of the impregnated articles the latter are supported on racks and air is circulated through a conventional air-circulating oven so as to cause the air to pass all around the articles to dissipate excess heat.

The overall process of the present invention can be carried out by impregnating the wood utilizing the vacuum-pressure operation previously described. The impregnated wood then can be placed in an air circulating oven and heated as previously described to polymerize the monomers to thermoplastic products.

The following examples further illustrate the present invention and are not intended to limit the scope thereof:

EXAMPLE 1

A mixture was formulated by admixing one percent by weight $\alpha,\alpha'$-azobisisobutyronitrile based on the weight of the monomer to tert-p-butylstyrene. To this mixture there was then added azo oil black dye, for color purposes only, in an amount of 2.5 ounces per 10 pounds of mixture (monomer plus catalyst). This mixture was then used to coat maple lumber in a manner as described below.

Hard maple lumber was placed in a tank which was capable of maintaining a vacuum and sustaining relatively high pressure. The pressure within the tank was lowered to about 20 inches of mercury for about 2 hours. While the vacuum was maintained, the mixture described above was introduced into the tank to a level completely immersing the lumber. The pressure within the tank was raised to about 140 p.s.i. for about 2 hours with the result that the wood was impregnated to an acceptable depth. After the impregnating cycle the wood was placed in an air circulating oven at a temperature of 200° F. for 3 hours. After 3 hours the monomer had completely polymerized to a thermoplastic product which provided a composite wood-polymer product having a high degree of toughness extending inwardly from its outer surface. The surface of the product could be sanded or otherwise machined or worked into any desired shape so as to provide an exceptionally smooth finish without approaching the actual depth of impregnation.

EXAMPLE 2

Example 1 was repeated using as an additive to the mixture of monomer and catalyst, 0.5 percent by weight, based on the weight of monomer, divinyl benzene. The impregnated lumber had even better sanding and finishing characteristics than the lumber of Example 1.

EXAMPLE 3

Example 1 was repeated with the exception that the impregnated wood was allowed to stand overnight before being subjected to the heating cycle. The impregnated lumber had properties comparable to the properties of the lumber of Example 2.

EXAMPLE 4

The following lumber was impregnated in a manner as described in Example 2. The lumber product had properties comparable to the properties of the lumber product of Example 2:

(1) White Pine Lumber
(2) Bass Wood Lumber
(3) Black Walnut Lumber
(4) Birch Lumber
(5) Plywood Veneer In the practice of the disclosed methods the depth of impregnation of the wood will depend on several factors such as the species of wood, its thickness and the length of time it is immersed in the monomer. In some instances it will be desirable that the depth of impregnation be less than the thickness of the wood, whereas in other instances it will be desirable that the wood be impregnated throughout its thickness. By varying the thickness of a particular species of wood, or by varying the time or pressure of the impregnating cycle, the depth of impregnation may be varied.

What is claimed is:

1. A composite wood-polymer product consisting essentially of wood impregnated with a thermoplastic polymer of tert-butylstyrene, said polymer being present in an amount sufficient to provide a tough protective surface resistance to water absorption.

2. The product of claim 1 wherein the wood of said wood-polymer product is uniformly impregnated with said polymer from surface to surface.

3. The product of claim 1 wherein the wood of said wood-polymer product is impregnated with said polymer at less than the thickness of said wood.

References Cited

UNITED STATES PATENTS

| | | | |
|---|---|---|---|
| 1,456,323 | 5/1923 | McPherson | 117—147X |
| 2,859,135 | 11/1958 | Rossin | 117—161 |
| 3,083,118 | 3/1963 | Bridgeford | 117—148X |
| 3,401,213 | 9/1968 | Trementozzi | 117—148X |

WILLIAM D. MARTIN, Primary Examiner

W. R. TRENOR, Assistant Examiner

U.S. Cl. X.R.

117—59